United States Patent
Long

(10) Patent No.: US 10,583,912 B2
(45) Date of Patent: *Mar. 10, 2020

(54) COMBINED FAN AND MOTOR

(71) Applicant: Wisk Aero LLC, Mountain View, CA (US)

(72) Inventor: Geoffrey Alan Long, Montara, CA (US)

(73) Assignee: WISK AERO LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/282,186

(22) Filed: Feb. 21, 2019

(65) Prior Publication Data

US 2019/0185140 A1 Jun. 20, 2019

Related U.S. Application Data

(63) Continuation of application No. 15/599,986, filed on May 19, 2017, now Pat. No. 10,259,563.

(51) Int. Cl.
| | |
|---|---|
| *B64C 11/02* | (2006.01) |
| *B64D 27/24* | (2006.01) |
| *B64C 11/28* | (2006.01) |
| *H02K 21/24* | (2006.01) |
| *H02K 7/14* | (2006.01) |
| *B64C 11/20* | (2006.01) |

(Continued)

(52) U.S. Cl.
CPC .............. *B64C 11/02* (2013.01); *B64C 11/20* (2013.01); *B64C 11/28* (2013.01); *B64C 27/32* (2013.01); *B64C 29/0025* (2013.01); *B64D 27/24* (2013.01); *B64D 35/02* (2013.01); *H02K 7/14* (2013.01); *H02K 21/24* (2013.01)

(58) Field of Classification Search
CPC ........... F16D 2129/065; F16D 2121/18; B64C 11/02; B64C 11/28; B64C 11/20; B64C 29/0025; B64C 27/32; B64D 27/24; H02K 7/14; H02K 7/10; H02K 7/106
USPC ................ 310/77, 103; 416/169 R; 335/229; 70/276

See application file for complete search history.

(56) References Cited

U.S. PATENT DOCUMENTS

| | | |
|---|---|---|
| 2,959,373 A | 11/1960 | Zuck |
| 6,376,946 B1 | 4/2002 | Lee |

(Continued)

FOREIGN PATENT DOCUMENTS

| | | | |
|---|---|---|---|
| CA | 2882258 | 2/2014 | |
| CA | 2969407 | * 6/2016 | ............... A62B 1/08 |

(Continued)

OTHER PUBLICATIONS

Long, High Efficiency, High Power Density Electric Motors, Sep. 29, 2009.

*Primary Examiner* — Burton S Mullins
(74) *Attorney, Agent, or Firm* — Kilpatrick Townsend & Stockton LLP

(57) ABSTRACT

A lift fan includes a stator which is configured to output a magnetic field. The lift fan also includes a first housing which in turn includes a blade, a second housing, and a magnet array. The magnet array is coupled to either the first housing or the second housing and the housing, which is coupled to the magnet array, rotates in response to the magnet array responding magnetically to the magnetic field output by the stator.

20 Claims, 8 Drawing Sheets

(51) Int. Cl.
  *B64C 29/00* (2006.01)
  *B64C 27/32* (2006.01)
  *B64D 35/02* (2006.01)

(56) References Cited

U.S. PATENT DOCUMENTS

| | | | |
|---|---|---|---|
| 6,575,401 B1 | 6/2003 | Carver | |
| 6,664,689 B2 | 12/2003 | Rose | |
| 6,799,746 B2 | 10/2004 | Schafer | |
| 7,032,859 B2 | 4/2006 | Mohr | |
| 7,410,123 B2 | 8/2008 | Nunnally | |
| 8,074,922 B2 | 12/2011 | Bojiuc | |
| 9,783,288 B1 * | 10/2017 | Moore | B64C 27/24 |
| 9,809,300 B1 * | 11/2017 | Kuentzel | B64C 11/343 |
| 10,259,563 B2 * | 4/2019 | Long | B64C 11/18 |
| 2003/0217668 A1 | 11/2003 | Fiske | |
| 2005/0082421 A1 | 4/2005 | Perlo | |
| 2015/0270760 A1 | 9/2015 | Kreidler | |
| 2015/0367935 A1 | 12/2015 | Long | |
| 2016/0031555 A1 | 2/2016 | Bevirt | |
| 2017/0274992 A1 | 9/2017 | Chretien | |
| 2017/0283048 A1 | 10/2017 | Beckman | |
| 2017/0341740 A1 | 11/2017 | Vander Lind | |

FOREIGN PATENT DOCUMENTS

| | | | |
|---|---|---|---|
| WO | 0042333 * | 7/2000 | F16D 65/14 |
| WO | 2015198200 | 12/2015 | |

* cited by examiner

COMBINED FAN AND MOTOR

CROSS REFERENCE TO OTHER APPLICATIONS

This application is a continuation of co-pending U.S. patent application Ser. No. 15/599,986 entitled COMBINED FAN AND MOTOR filed May 19, 2017 which is incorporated herein by reference for all purposes.

BACKGROUND OF THE INVENTION

New types of aircraft are being developed which are battery powered. Existing types of lift fans may not be attractive for such aircraft because they are not aerodynamic enough, they weight too much, and/or they consume too much power. New types of lift fans which better suited to meet the needs of such new aircraft would be desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of a lift fan (or, more specifically, a combined fan and motor) are described herein. In some embodiments, the lift fan includes a stator (which is configured to output a magnetic field), a first housing (which includes at least one blade and in one example the first housing is a top or upper housing), a second housing (e.g., a bottom or lower housing), and a magnet array (where the magnet array is coupled to either the first housing or the second housing and the housing which is coupled to the magnet array rotates in response to the magnet array responding magnetically to the magnetic field output by the stator). First, an example aircraft which may use a combined fan and motor is described. Then, various aspects and/or embodiments of the combined fan and motor are described.

Figure 1:
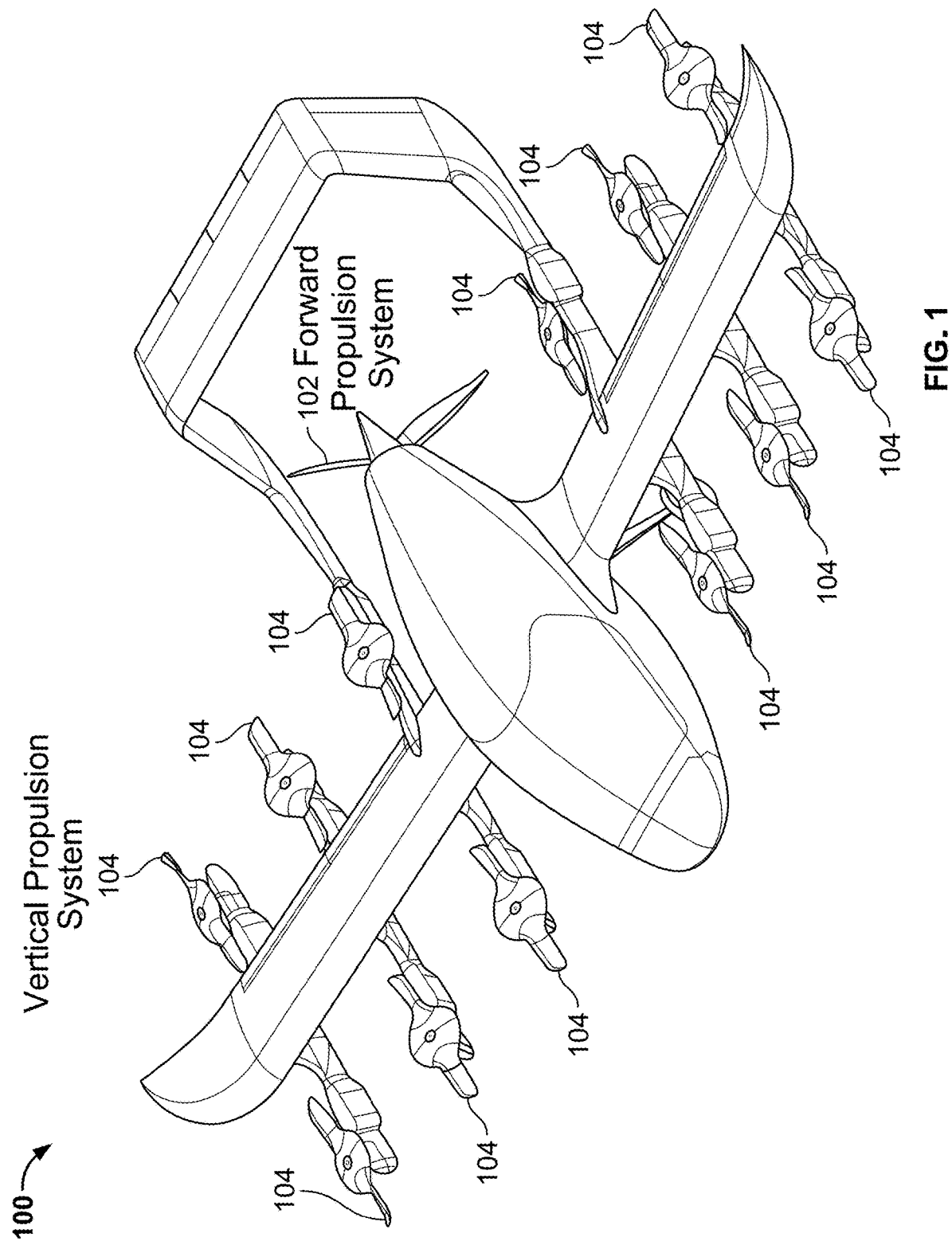
FIG. 1 is a diagram illustrating an embodiment of a multicopter which uses a combined fan and motor.

FIG. 1 is a diagram illustrating an embodiment of a multicopter which uses a combined fan and motor. It is noted that the aircraft shown here is merely exemplary and a combined fan and motor may be used in a variety of aircraft.

In the example shown, the multicopter (100) has two propulsion systems: forward propulsion system (102) and vertical population system (104). The forward propulsion system (102) is used to propel the multicopter forwards along a longitudinal (roll) axis. As shown here, the blades of the lift fans in the forward propulsion system (102) are oriented to rotate in a vertical plane. The forward propulsion system (102) produces lift to keep the aircraft airborne in a manner similar to a fixed wing aircraft (e.g., where the forward propulsion of the multicopter causes airflow over and under the wings which in turn induces an aerodynamic force upwards on the bottom of the wings).

In the vertical propulsion system (104), the blades of the lift fans are oriented to rotate in a horizontal plane. The vertical propulsion system (104) is used to move (e.g., up or down) the aircraft along a vertical (yaw) axis. The vertical propulsion system (104) produces lift in a manner similar to helicopters where the lift is produced by the airflow downwards.

In various embodiments, the shapes and/or pitch angles of the blades in the forward propulsion system (102) and vertical population system (104) may be optimized for the specific type of flying (e.g., forward flight versus vertical flight).

While the multicopter is flying, one of the propulsion systems may be turned off (if desired) while the other propulsion system remains on. For example, if the multicopter (100) is flying forwards at a constant altitude, then the vertical propulsion system (104) may be turned off to conserve power and/or because the forward propulsion system (102) is more efficient at flying in this manner. Or, if the multicopter is hovering in-air at a constant position, the forward propulsion system (102) may be turned off.

In the exemplary multicopter, the lift fans of the vertical propulsion system (104) are implemented using combined fan and motors (various embodiments of which are described below). As shown here and in some subsequent examples, a combined fan and motor may be relatively low profile (e.g., relatively short). This is desirable when the multicopter is flying forwards because it is more aerodynamic compared to taller lift fans. Also, because the motor is combined with the fan (e.g., the motor is housed inside of the fan), there is one integrated piece. Generally speaking, it is more aerodynamic to have a single component attached to an aircraft than two components. For example, if a motor unit were "hidden" behind a fan unit, it would still be less aerodynamic than a single, combined fan and motor (e.g., all other things being equal).

In this example, the lift fans in the vertical propulsion system (104) have two blades and in the state shown here the blades are oriented so that one blade is pointing forwards and the other blade is pointing backwards. This orientation offers the least wind resistance when the multicopter is flying forwards and in some embodiments the lift fan is able to stop mid-flight with the upper housing oriented such that one blade (e.g., a first blade) is pointing forwards and the other blade (e.g. a second blade) is pointing backwards. A combined fan and motor with three or more blades would result in more drag during forward flight and illustrates why a combined fan and motor with two blades is more attractive than one with three or more blades (at least for the example shown here where the lift fan is able to stop while the multicopter is flying).

The following figure shows an example of a combined fan and motor.

Figure 2:
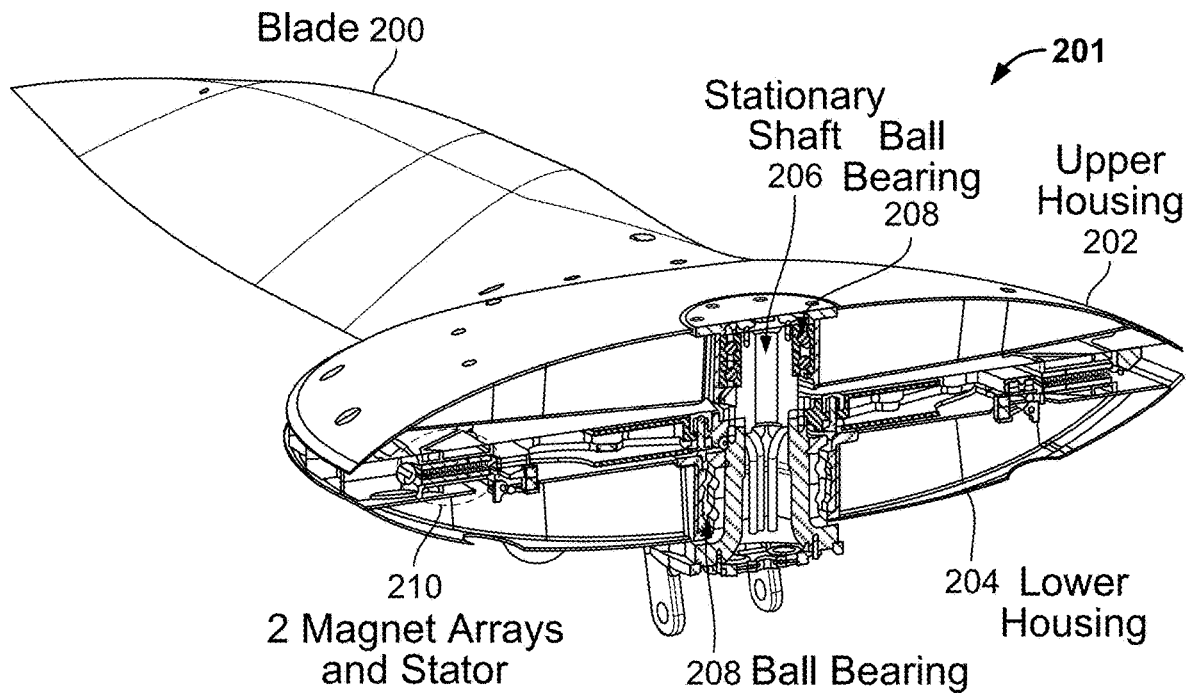
FIG. 2 is a diagram illustrating an embodiment of a combined fan and motor.
Figure 2:
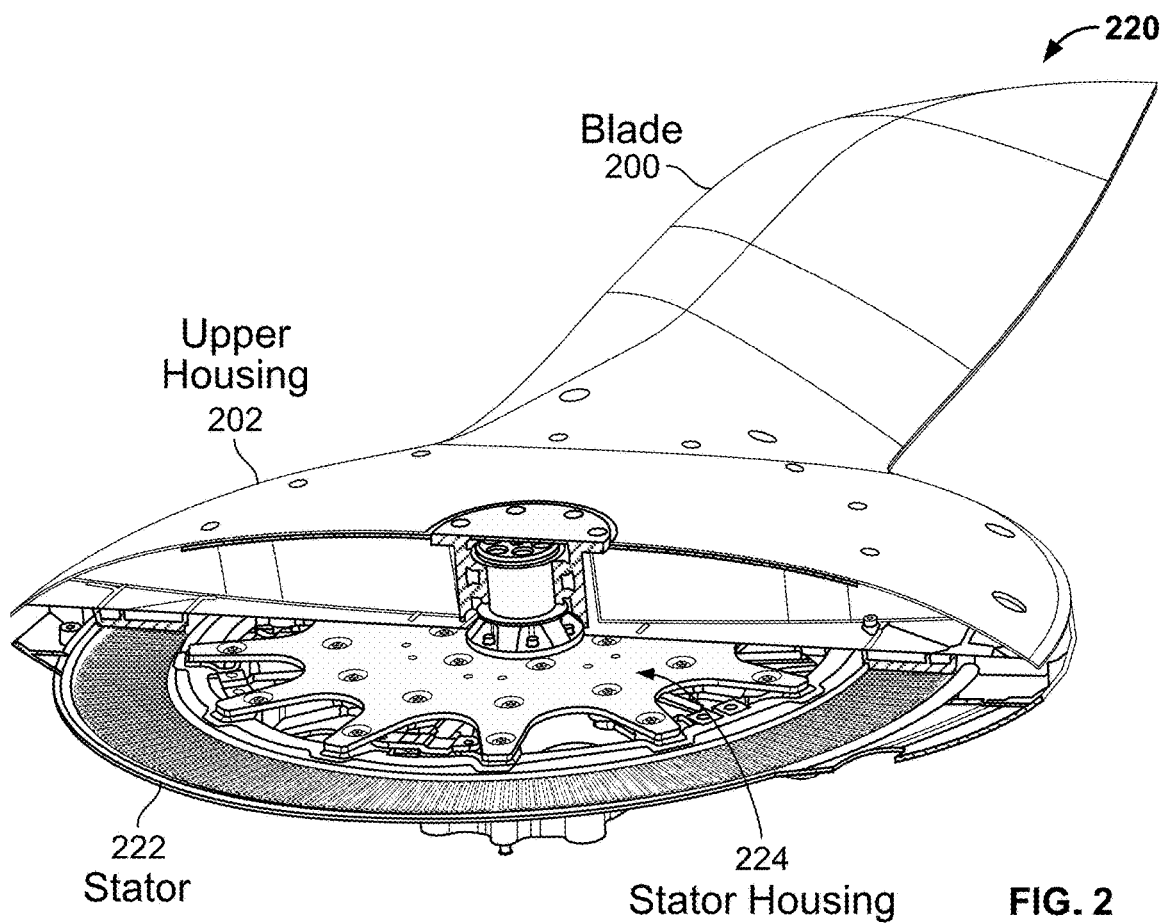

FIG. 2 is a diagram illustrating an embodiment of a combined fan and motor. In some embodiments, the lift fans in the vertical propulsion system (104) from FIG. 1 are implemented as shown here. In diagram 201, a cross section of the exemplary combined fan and motor is shown with a blade (200) attached to an upper housing (202). The other half of the upper housing (which is not shown here) would have another blade attached to that part of the upper housing. In other words, the exemplary combined fan and motor has two blades.

In this example, the upper housing (202) and the lower housing (204) are substantially symmetric (ignoring the blades which are attached to the upper housing). As will be described in more detail below, the upper housing (202) and lower housing (204) are connected together at various points, for example using screws or bolts. These connections stabilize the combined fan and motor as it rotates about the stationary shaft (206) during flight. For example, some other lift fans which only have an upper housing and no lower housing would more easily "wobble" while rotating.

A stationary shaft (206) sits in the middle of and is encased by the upper housing (202) and lower housing (204). The blade (200), upper housing (202), lower housing (204), and attached parts are able to rotate about the shaft (206) because of a plurality of ball bearings (208). In this example there are two layers of ball bearings for the upper housing and two layers of ball bearings for the lower housing, but naturally any number of layers and/or ball bearings may be used.

Diagram 220 shows an alternate view with a better view of the stator (222). The stator housing (224) which is also shown here is used to hold the stator in place and/or connect the stator to the rest of the lift fan. It is noted that that magnet arrays and stator are sized so that they have a relatively large diameter (e.g., the magnet arrays and stator sit close to the outer edge of the upper and lower housing as opposed to closer to the center). In this example, the magnet arrays and stator have relatively large diameters because with this motor topology and/or for relatively slow rotations per minute direct drive applications like this, a motor with magnet arrays and a stator with larger diameters is better.

In this example, the motor includes two arrays of magnets and a stator (202) which uses magnetic forces (e.g., attraction and/or repulsion) to rotate the combined fan and motor. The following figure shows the stator and two magnet arrays (210) in more detail. A magnet array may alternatively be referred to as an array of magnets (e.g., because the magnet array includes a plurality of magnets arranged around or as a circle).

Figure 3:
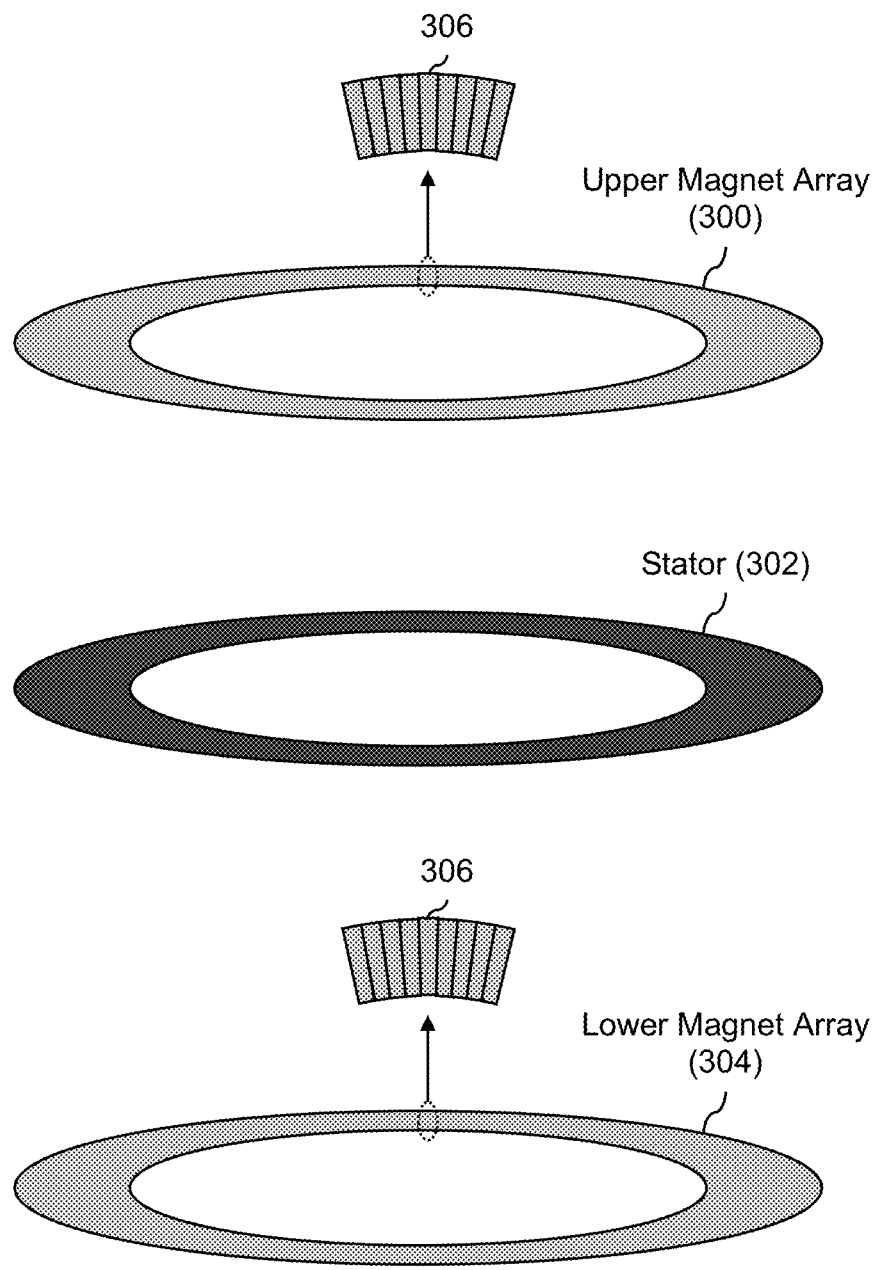
FIG. 3 is a diagram illustrating an embodiment of an upper magnet array, a lower magnet array, and a stator associated.

FIG. 3 is a diagram illustrating an embodiment of an upper magnet array, a lower magnet array, and a stator associated. In the example shown, the two magnet arrays and stator (210) from FIG. 2 are shown in more detail using an exploded view. These components are associated with the motor of the exemplary combined fan and motor, where the combined fan and motor rotates due to magnetic forces (e.g., as opposed to mechanical forces, such as from a belt, gears, etc.).

In this example, the upper magnet array (300) and lower magnet array (304) are full and flat circular arrays of magnets and are part of a brushless motor (at least in this example). For example, as the close-up views (306) show, each array is made up of a plurality of magnets. Individual magnets may be of various shapes. In some embodiments, a magnet is substantially a sector of a right cylindrical annulus, where a first surface is an upper surface having a shape that is substantially circular or trapezoidal and a second surface and third surface (e.g., substantially opposite each other and adjacent to the top surface) are flat rectangular or noncircular surfaces. In some embodiments, a magnet is substantially a right trapezoidal prism. In some embodiments, the upper magnet array (300) has substantially all of its magnetic field facing downwards and the lower magnet array (304) has substantially all of its magnetic field facing upwards.

The stator (302) in this example is a circular array which is "sandwiched" between the upper magnet array and the lower magnet array when the stator and the two magnet arrays are in their regular position. In one example, there is an air gap of 1.2 mm between the stator and each magnet array (e.g., 1.2 mm above the stator and below the stator). In some embodiments, the stator includes wire winding (not shown) mounted to the stator housing. For example, the stator may include a three phase litz wire winding mounted to the stator housing.

The stator (302) produces a varying magnetic field which (at various times) attracts or repels the upper magnet array and the lower magnet array. The stator (302) in this example is coupled or otherwise connected to a stationary shaft (e.g., 206 in FIG. 2) such that the stator is also stationary. The upper magnet array (300) is coupled to a (e.g., rotatable) upper housing (e.g., 202 in FIG. 2), where the upper housing rotates in response to the upper magnet array responding magnetically to the magnetic field output by the stator. That is, the upper magnet array will be magnetically attracted to (or magnetically repelled by) the magnetic field output by the stator and the coupled upper magnet array and upper housing will want to move closer (or move away). Since they are able to rotate, this movement corresponds to the coupled upper magnet array and upper housing rotating about the stationary shaft.

Similarly, the (e.g., rotatable) lower magnet array (304) is coupled to a rotatable lower housing (e.g., 204 in FIG. 2) and the coupled lower magnet array and lower housing rotate in response to the magnetic field output by the stator. Therefore, by adjusting the magnetic field which is output by the stator, the upper housing, lower housing, and attached blades rotate (e.g., due to magnetic forces) while the shaft and connected stator remain stationary. In other words, the rotation of the combined fan and motor is controlled by the (varying) magnetic field produced by the stator.

Some electric motors which translate electrical energy (e.g., from a battery) into mechanical energy (e.g., the rotation of the lift fan) do so using mechanical means, such as belts, or gears. A lift fan which uses magnet arrays and stators may be lighter and for some applications (e.g., battery powered aircraft), the lighter weight may be an attractive choice. Although the use of magnets to rotate a lift fan may add more weight than gears or belts, gears and belts add complexity and reduce reliability. For these reasons, in this example (where reliability is desirable because it is an aircraft application) magnet arrays are used to rotate the lift fan.

The arrangement of magnets shown here is referred to as an axial flux motor. An alternate arrangement of the stator and magnet arrays would be to place them on the curved surface where the stationary shaft and two housings interface (e.g., near the ball bearings (208) in FIG. 2); this is referred to as a radial flux motor. One reason why the axial flux motor arrangement shown here may be more attractive than a radial flux motor is that in a radial flux motor, the stator is cylindrical as opposed to a flat annular shape. This causes the axial thickness to be larger for the radial flux configuration which is bad for drag. Another reason is that a radial flux motor is harder to manufacture. Also, a radial flux configuration tends to experience more variation in the gap, for example because centrifugal load on the magnets in a radial flux configuration tends to close the gap and/or because thermal expansion of the stator as it heats up tends to close the gap in a radial flux motor. For these reasons, an axial flux motor may be more attractive than a radial flux motor.

In some embodiments, the upper magnet array (300) and lower magnet array (304) include three pole magnets. A three pole magnet may have two north pole surfaces and one south pole surface (as an example) with substantially all of the field coming into (or out of) the north pole, split substantially evenly between and going out of the south poles. The bottom surface has a negligible amount of field going out (or coming in). A three pole magnet may be more attractive compared to some other types of magnet arrays, such as a Halbach array or an alternating pole magnet array because of better electromagnetic performance (e.g., produces a magnetic field with a more desirable arrangement of field lines) and/or better manufacturing characteristics (e.g., reduces the manufacturing complexity and/or cost).

The magnets in the upper magnet array and the lower magnet array may be attached to or included in the combined fan and motor in a variety of ways. The following figures show some examples.

Figure 4:
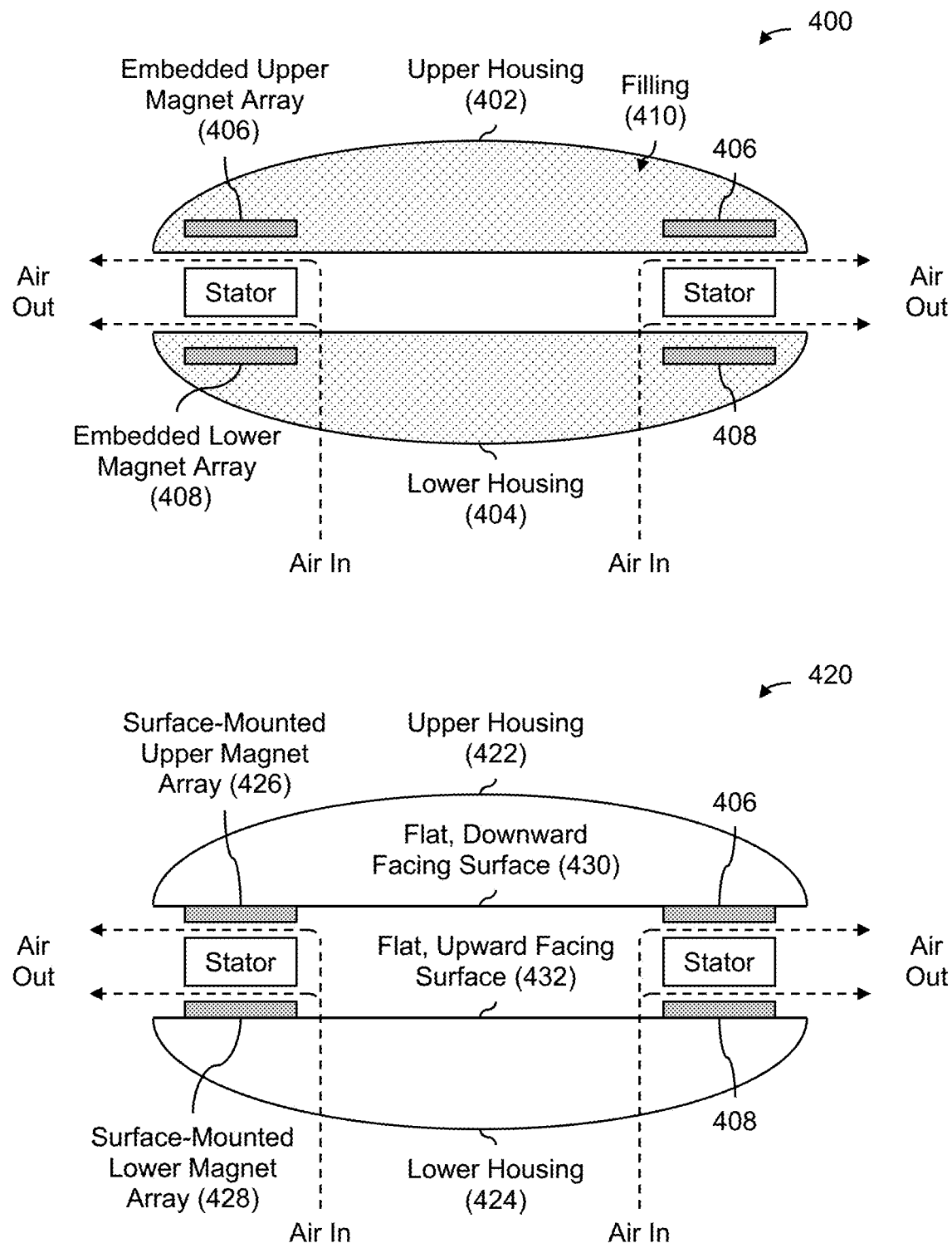
FIG. 4 is a diagram illustrating an embodiment of surface-mounted and embedded magnet arrays.

FIG. 4 is a diagram illustrating an embodiment of surface-mounted and embedded magnet arrays. For simplicity, some elements or components (such as the stationary shaft) which are shown in other figures are not shown here. In the example shown, diagram 400 shows a cross-sectional view of an upper magnet array (406) and a lower magnet array (408) where the magnets are embedded magnets. The embedded magnets in this example are held in place in the body of the upper housing (402) and lower housing (404) using a filling (410). In some embodiments, embedded magnets are formed using magnet powder to which a magnetic field (e.g., to orient the magnet powder to along desired axis lines) and pressure are applied.

Diagram 420 shows a cross-sectional view of an upper magnet array (426) and a lower magnet array (428) where the magnets are mounted to the surface of the upper housing and lower housing, respectively. The upper housing (422) has magnets (426) attached to its flat, downward facing surface (428) which faces the rotatable lower housing (424). The rotatable lower housing (424) similarly has magnets which are surface mounted to its flat, upward facing surface (432). A variety of techniques may be used to attach the magnets. In one example, the magnets are bonded and swaged onto aluminum carriers which are then in turn bolted to the flat surfaces of the upper and lower housing.

Diagram 400 and diagram 420 both show an example of how air may be used to cool the stator and/or magnet arrays. In this example, the lower housing has inlet holes (not shown) via which air enters the lift fan. The air comes up through the lower housing (e.g., via some air inlet holes or tubes) and then radiates outward between the two flat surfaces of the upper and lower housing. In some embodiments, the inlet holes have scoops (e.g., to assist with the intake of air).

The following figures show more features associated with the combined fan and motor from FIG. 2.

Figure 5:
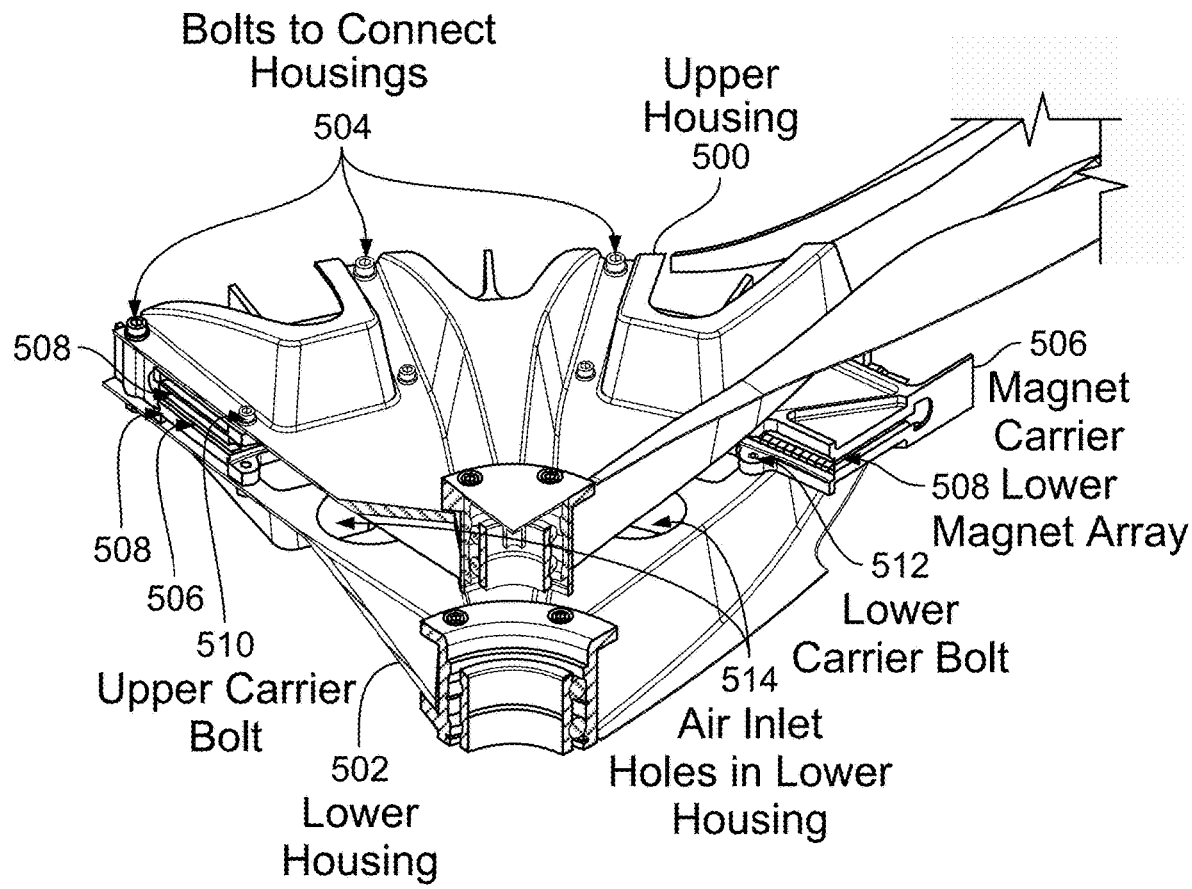
FIG. 5 is a diagram illustrating an embodiment of an interior cross section of a combined fan and motor.

FIG. 5 is a diagram illustrating an embodiment of an interior cross section of a combined fan and motor. In the diagram shown, there is a ring of bolts (504) which connects the upper housing (500) and the lower housing (502) to each other. In one example, there are on the order of 8-32 such bolts which connect the two housings to each other. As described above, by connecting the upper housing and lower housing to each other (in this example, using a ring of bolts (504)), this makes the combined fan and motor more stable when it rotates. Naturally, the number and locations of these bolts is merely exemplary and is not intended to be limiting.

This diagram also shows a magnet carrier (506) which may be used to attach the upper magnet array (not visible from this view) and the lower magnet array (508) to the (flat) surface of the upper housing (500) and lower housing (502), respectively. In some embodiments, the magnet carrier is U-shaped with two flat interior surfaces. The upper magnet array may be attached to the upper interior surface of the magnet carrier and the lower magnet array may be attached the upper interior surface of the magnet carrier so that the two arrays face each other with the stator (not shown) between them. Alternatively, there may be two magnet carriers: one for the upper magnet array and housing and another for the lower magnet array and housing. The magnet carrier(s) is/are attached to the upper housing (500) using multiple upper carrier bolts (510) and to the lower housing (502) using multiple lower carrier bolts (512). In one example, there may be on the order of 6-32 bolts for each half/housing. In one example described above, there is an air gap of 1.2 mm between the stator and each magnet array. Holes 514 show an example of air inlet holes used to draw air into the lift fan and cool the stator and/or magnet arrays.

In some embodiments, due to the relatively small gap between the stator and magnet arrays, techniques are used to prevent and/or mitigate brushing between the stator and magnet arrays. For example, a stator housing which holds the stator in place between the two magnet arrays may be made sufficient stiff so that it does not flex and cause the stator to make contact with the rotating magnet arrays. In some embodiments, the thickness of the stator housing is made sufficiently thick (e.g., on the order of 1.25 inches) and/or using materials with sufficient stiffness for the stator housing (e.g., aluminum or carbon fiber composite).

The lift fan assembly embodiment shown in FIG. 2 includes some cooling features. The following figure discusses those features in more detail.

Figure 6:
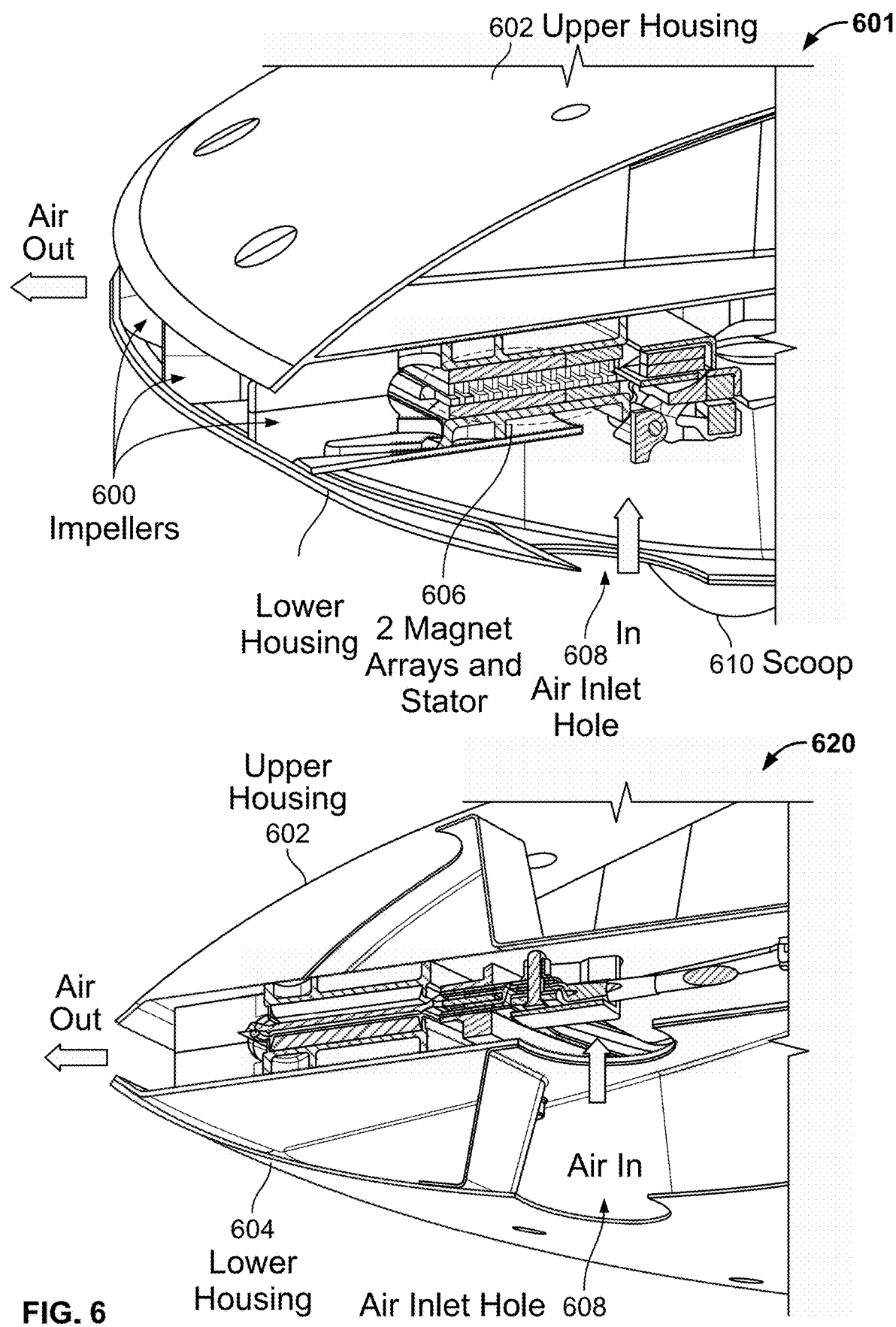
FIG. 6 is a diagram illustrating an embodiment of cooling features in a combined fan and motor.

FIG. 6 is a diagram illustrating an embodiment of cooling features in a combined fan and motor. Diagram 601 shows an angled view, looking down on the lift fan. In that example, air enters the lift fan through a plurality of air inlet holes (608) in the bottom housing (604). Scoops (610) which extrude from the exterior of the bottom housing help to pull air into the inlet holes (608). The air passes through the space between the upper housing (602) and the lower housing (604), and specifically over the components between the two housings, including the two magnet arrays and stator (606). These components may not operate properly if they overheat.

The air (with any heat removed from the magnet arrays and/or stator) leaves the combined fan and motor through the impellers (600). The impellers in this example are attached to the upper housing (602) and lower housing (604), for example to the downward facing surface (430) and upward facing surface (432) in FIG. 4, respectively.

Diagram 620 shows an angled view, looking up at the lift fan. From this view, the air inlet holes (608) in the exterior, curved surface of the lower housing and the flat, interior surface of the lower housing via which air enters may be seen. In some embodiments, to further improve the airflow, the inlet holes may be widened, the inlet corners may be rounded, and/or a printed tube to connect the two holes may be added. Other modifications (e.g., to the rest of the lift fan, other than the inlet holes) to improve cooling and/or airflow include increasing clearance along the airflow path, increasing the area over which the air flows, and/or repositioning or moving components to smooth out the air flow.

In this example, only the lower housing has air inlet holes. The reason for this is that the upper housing (in this example at least) includes or is otherwise attached to the fan blades which makes the loads much higher and therefore the upper housing is thicker compared to the lower housing. This made it harder cutout holes in the upper housing for air flow. Also, gravity tends to cause things to fall downward. Air inlet holes on the upper housing could cause more debris and/or rain to collect inside compared to inlets on the bottom. The number and placement of impellers and inlets shown here is merely exemplary and is not intended to be limiting.

The following figure shows an alternate view of the impellers with the upper and lower housings separated.

Figure 7:
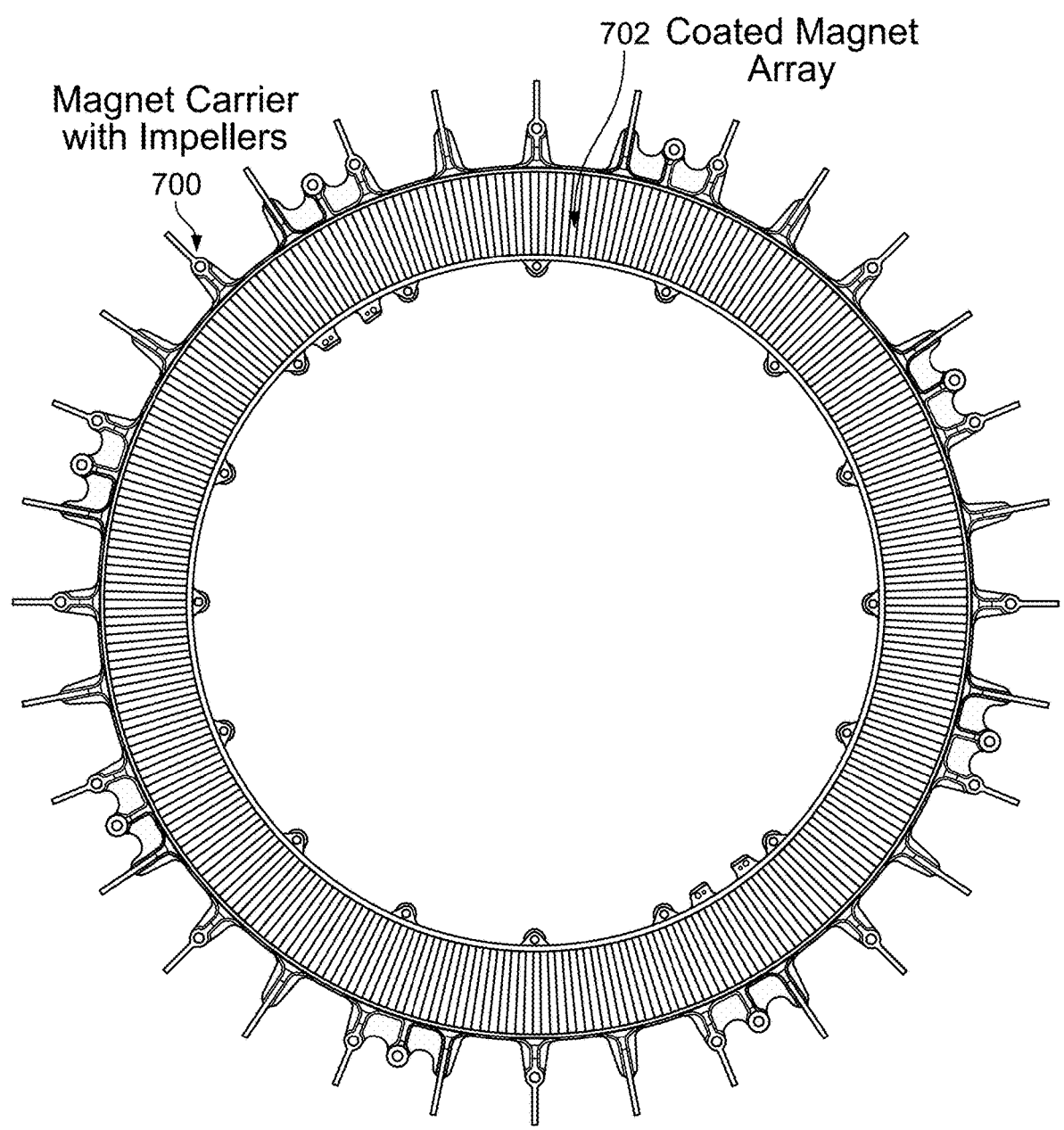
FIG. 7 is a diagram illustrating an embodiment of a magnet carrier with impellers.

FIG. 7 is a diagram illustrating an embodiment of a magnet carrier with impellers. In this example, the magnets are surface mounted and the impellers are part of the magnet carrier. As described above, a magnet carrier may be used to attach a magnet array to the surface of a housing. In the diagram shown, the impellers are part of the magnet carrier (700) and extend radially outward from the outer circular edge of the magnet array (702).

In this diagram, only a single magnet carrier is shown. There is a corresponding magnet carrier (not shown) where the two carriers are designed to be connected to each other where the impellers on the two carriers line up with each other. Note, for example, the various holes (e.g., for bolts or screws) in the impellers and near the inner and outer rings of the magnet array to align the various parts properly.

Alternatively, the impellers may be formed using a single piece and/or separately from a magnet carrier. For example, the magnet arrays are implemented as embedded magnets and therefore there are no magnet carriers, the impellers may be incorporated into other components and/or as a stand-alone part.

When all of the parts are connected, the gap between the magnet arrays and the stator is relatively small and any rubbing between the stator and magnet array(s) (e.g., as the combined fan and motor rotates) would be undesirable. In this example, the magnet array (702) is coated with a substance to reduce the friction of the magnet array (e.g., the magnet array becomes slicker and/or smoother). This mitigates the negative effects of any rubbing (e.g., heat and/or wear due to friction) should the stator come into contact with the magnet array(s). In some embodiments, a polytetrafluoroethylene (PTFE), such as Teflon, is used as the coating.

Returning to FIG. 1, in some embodiments a lock is used to lock a combined fan and motor in the position shown (i.e., with one blade pointing forwards and the other pointing backwards) when the combined fan and motor are stopped mid-flight (e.g., when flying forwards). The following figure shows an example of a magnetic lock. Naturally, other types of locks (e.g., mechanical locks) may be employed.

Figure 8:
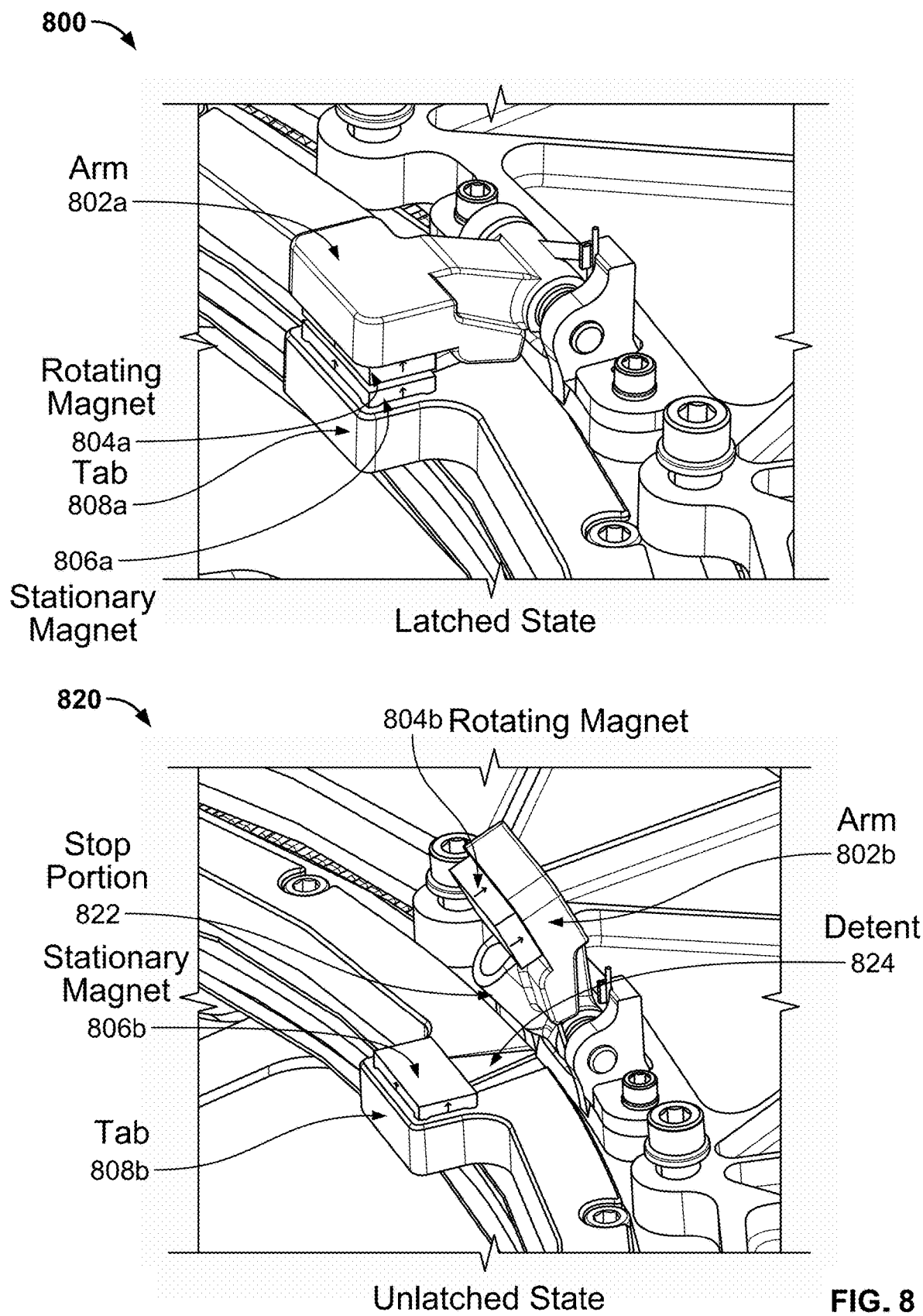
FIG. 8 is a diagram illustrating an embodiment of a magnetic lock which is used to lock a combined fan and motor.

FIG. 8 is a diagram illustrating an embodiment of a magnetic lock which is used to lock a combined fan and motor. Diagram 800 shows the lock in a latched state. In the state shown, a rotating magnet (804a) and stationary magnet (806a) are parallel to each other and sufficiently close so that they are magnetically attracted to each other. For example, in FIG. 1, the magnetic force may be sufficient to keep the combined fan and motors from moving about while the vertical propulsion system (104) is off and the multicopter is flying forwards.

The rotating magnet (804a) is attached via arm 802 to parts of the combined fan and motor that rotate (e.g., the housings, the magnet arrays, etc.) whereas the stationary magnet (806a) is attached via a tab (808a) to parts of the combined fan and motor that do not rotate (e.g., the stator, the shaft, etc.). There are a plurality of arms, rotating magnets, stationary magnets, and tabs which are distributed in a circle and positioned such that when they are locked (as shown in diagram 800), the combined fan and motor is locked in a position with one blade facing forwards and the other facing backwards. See, for example, FIG. 1.

Diagram 820 shows the lock in an unlatched and unrotated state, where the arm (802b) is lifted up so that the rotating magnet (804b) and stationary magnet (806b) are sufficiently far apart and the combined fan and motor is free to rotate. The lifted arm (802b) exposes a stop portion (822) which is attached to the underside of the arm, as well as detent (824) which is adjacent to the tab (808b) on the stationary circular frame. When the lock is in the latched state, the stop portion sits in the detent. In this example, the stop portion is shaped like a tube and the detent is shaped like a V but any appropriate shape may be used.

To unlatch the lock, the combined fan and motor may be rotated slightly and/or slowly from the state and/or position shown in diagram 800. The stop portion (822) will come out of the detent (824) as a result of the rotation, causing the two magnets to separately slightly (not shown). This will reduce the amount of magnetic force and/or attractive between the two magnets. As the combined fan and motor spins faster, centrifugal force will eventually exceed the magnetic attraction between the magnets, causing the arm to lift up more fully.

To latch the lock, the combined fan and motor is slowed down until the amount of gravity pulling down on the arm exceeds the amount of centrifugal force pushing the arm upwards/outwards. The stop portion will be touching the stationary circular frame. The stop portion rides along the stationary circular frame until a detent is encountered. The combined fan and motor is rotated very slowly at this point so that when the stop portion enters the detent, the combined fan and motor will stop rotating (e.g., because of the magnetic force between the two magnets, which are not ever closer together because of the detent).

In some embodiments, spring force is also used to latch a combined fan and motor. For example, a lock may include a helical torsion spring or other spring.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A lift fan, comprising:
   a first housing which includes an unshielded blade extending radially outwards;
   a second housing, wherein the first housing and the second housing are incorporated into the lift fan such that a surface of the second housing faces a surface of the first housing, and the first housing and the second housing are connected at a plurality of points to stabilize the lift fan during operation;
   a magnet array, wherein:
      the magnet array is coupled to at least one of the first housing and the second housing; and
      the at least one of the first housing or the second housing which is coupled to the magnet array rotates in response to the magnet array responding magnetically to a magnetic field output by a stator; and
   a magnetic lock, wherein the magnetic lock includes a stationary magnet and a rotating magnet coupled to an arm, wherein the magnetic lock is adapted to magnetically engage when the arm is in a first position placing the rotating magnet parallel to the stationary magnet.

2. The lift fan of claim 1, further comprising the stator configured to output a magnetic field.

3. The lift fan of claim 1, wherein the magnetic lock is adapted to magnetically engage when the arm is in the first position in response to an amount of gravity pulling down on the arm exceeds an amount of centrifugal force caused by spinning of the lift fan pushing the arm upwards or outwards toward a second position.

4. The lift fan of claim 1, wherein:
   the first housing is an upper housing and the second housing is a lower housing; and
   the upper housing includes a second blade.

5. The lift fan of claim 1, wherein:
   the first housing is an upper housing and the second housing is a lower housing;
   the magnet array is an upper magnet array which is coupled to the upper housing; and
   the lift fan further includes a lower magnet array which is coupled to the lower housing and the lower housing rotates in response to the lower magnet array responding magnetically to the magnetic field output by the stator.

6. The lift fan of claim 1, wherein the magnet array includes an embedded magnet array.

7. The lift fan of claim 1, wherein the magnet array includes a surface-mounted magnet array.

8. The lift fan of claim 1, wherein:
   the magnet array includes a surface-mounted magnet array; and
   the lift fan further includes a magnet carrier which is used to couple the surface-mounted magnet array to at least one of the first housing and the second housing.

9. The lift fan of claim 1, wherein:
   the magnet array includes a surface-mounted magnet array;
   the lift fan further includes a magnet carrier which is used to couple the surface-mounted magnet array to at least one of the first housing and the second housing; and
   the magnet carrier includes an impeller.

10. The lift fan of claim 1, wherein the magnet array is coated with a substance which reduces a friction of the magnet array.

11. The lift fan of claim 1, wherein:
    the magnet array is coated with a substance which reduces a friction of the magnet array; and
    the substance includes polytetrafluoroethylene (PTFE).

12. The lift fan of claim 1, wherein:
    the first housing is an upper housing and the second housing is a lower housing;
    the upper housing includes a second blade; and
    the lift fan is able to stop in a fixed position with the upper housing oriented such that the unshielded blade is pointing forwards and the second blade is pointing backwards.

13. The lift fan of claim 1, wherein:
    the first housing is an upper housing and the second housing is a lower housing;
    the upper housing includes a second blade;
    the lift fan is able to stop in a fixed position with the upper housing oriented such that the unshielded blade is pointing forwards and the second blade is pointing backwards; and
    when the magnetic lock is in a locked state, the upper housing is oriented such that the unshielded blade is pointing forwards and the second blade pointing backwards.

14. The lift fan of claim 1, wherein:
    the first housing is an upper housing and the second housing is a lower housing;
    the upper housing includes a second blade;
    the lift fan is able to stop in a fixed position with the upper housing oriented such that the unshielded blade is pointing forwards and the second blade is pointing backwards; and
    when the magnetic lock is in a locked state, the upper housing is oriented such that the unshielded blade is pointing forwards and the second blade is pointing backwards.

15. A method, comprising:
    outputting a magnetic field using a stator, wherein the stator is included in a lift fan which further includes:
      a first housing which includes an unshielded blade extending radially outwards;
      a second housing, wherein the first housing and the second housing are incorporated into the lift fan such that a surface of the second housing faces a surface of the first housing, and the first housing and the second housing are connected at a plurality of points to stabilize the lift fan during operation; and
      a magnet array, wherein:
        the magnet array is coupled to at least one of the first housing and the second housing; and
        the at least one of the first housing or the second housing which is coupled to the magnet array rotates in response to the magnet array responding magnetically to a magnetic field output by a stator; and
      a magnetic lock, wherein the magnetic lock includes a stationary magnet and a rotating magnet coupled to an arm and the magnetic lock is adapted to magnetically engage when the arm is in a first position placing the rotating magnet parallel to the stationary magnet; and rotating the first housing or the second housing which is coupled to the magnet array in response to the magnet array responding magnetically to the magnetic field output by the stator.

16. The method of claim 15, wherein:

the first housing is an upper housing and the second housing is a lower housing;

the magnet array is an upper magnet array which is coupled to the upper housing; and the lift fan further includes a lower magnet array which is coupled to the lower housing and the lower housing rotates in response to the lower magnet array responding magnetically to the magnetic field output by the stator.

17. The method of claim 15, wherein:

the magnet array includes a surface-mounted magnet array;

the lift fan further includes a magnet carrier which is used to couple the surface-mounted magnet array to either the first housing or the second housing; and the magnet carrier includes an impeller.

18. The method of claim 15, wherein:

the first housing is an upper housing and the second housing is a lower housing;

the upper housing includes a second blade; and the lift fan is able to stop in a fixed position with the upper housing oriented such that the unshielded blade is pointing forwards and the second blade is pointing backwards.

19. The method of claim 15, wherein:

the first housing is an upper housing and the second housing is a lower housing;

the upper housing includes a second blade;

the lift fan is able to stop in a fixed position with the upper housing oriented such that the unshielded blade is pointing forwards and the second blade is pointing backwards; and when the magnetic lock is in a locked state, the upper housing is oriented such that the unshielded blade is pointing forwards and the second blade is pointing backwards.

20. The method of claim 15, wherein:

the first housing is an upper housing and the second housing is a lower housing;

the upper housing includes a second blade;

the lift fan is able to stop in a fixed position with the upper housing oriented such that the unshielded blade is pointing forwards and the second blade is pointing backwards; and when the magnetic lock is in a locked state, the upper housing is oriented such that the unshielded blade is pointing forwards and the second blade is pointing backwards.

* * * * *